(No Model.) 2 Sheets—Sheet 2.
H. WYMAN.
TAKE-UP MECHANISM FOR LOOMS.
No. 498,418. Patented May 30, 1893.
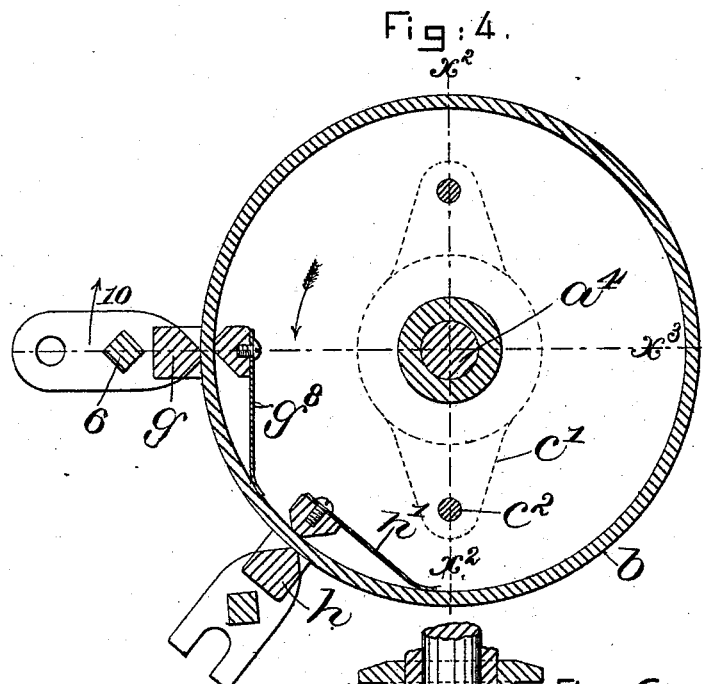
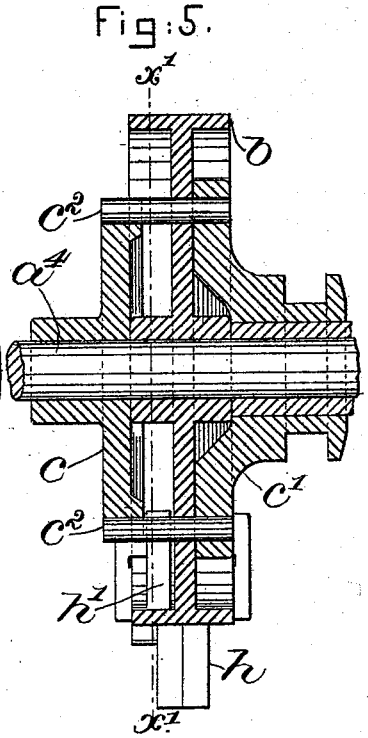
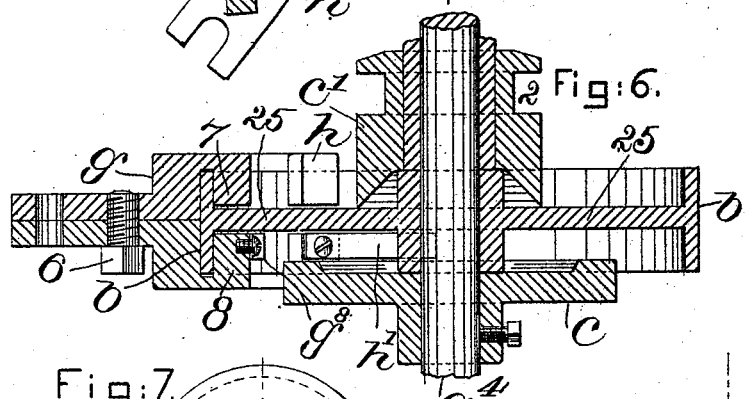
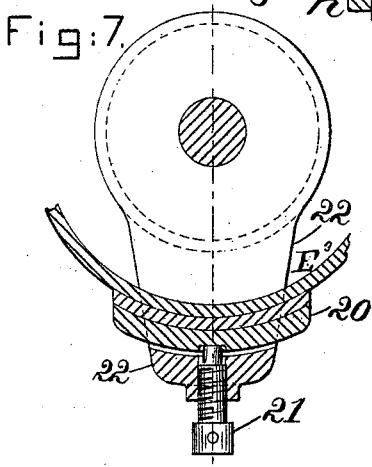
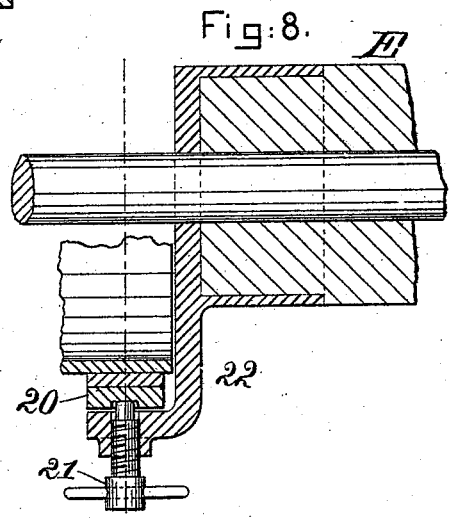
Witnesses.
Edward F. Allen
Fred S. Greenleaf
Inventor.
Horace Wyman
by Crosby & Gregory attys

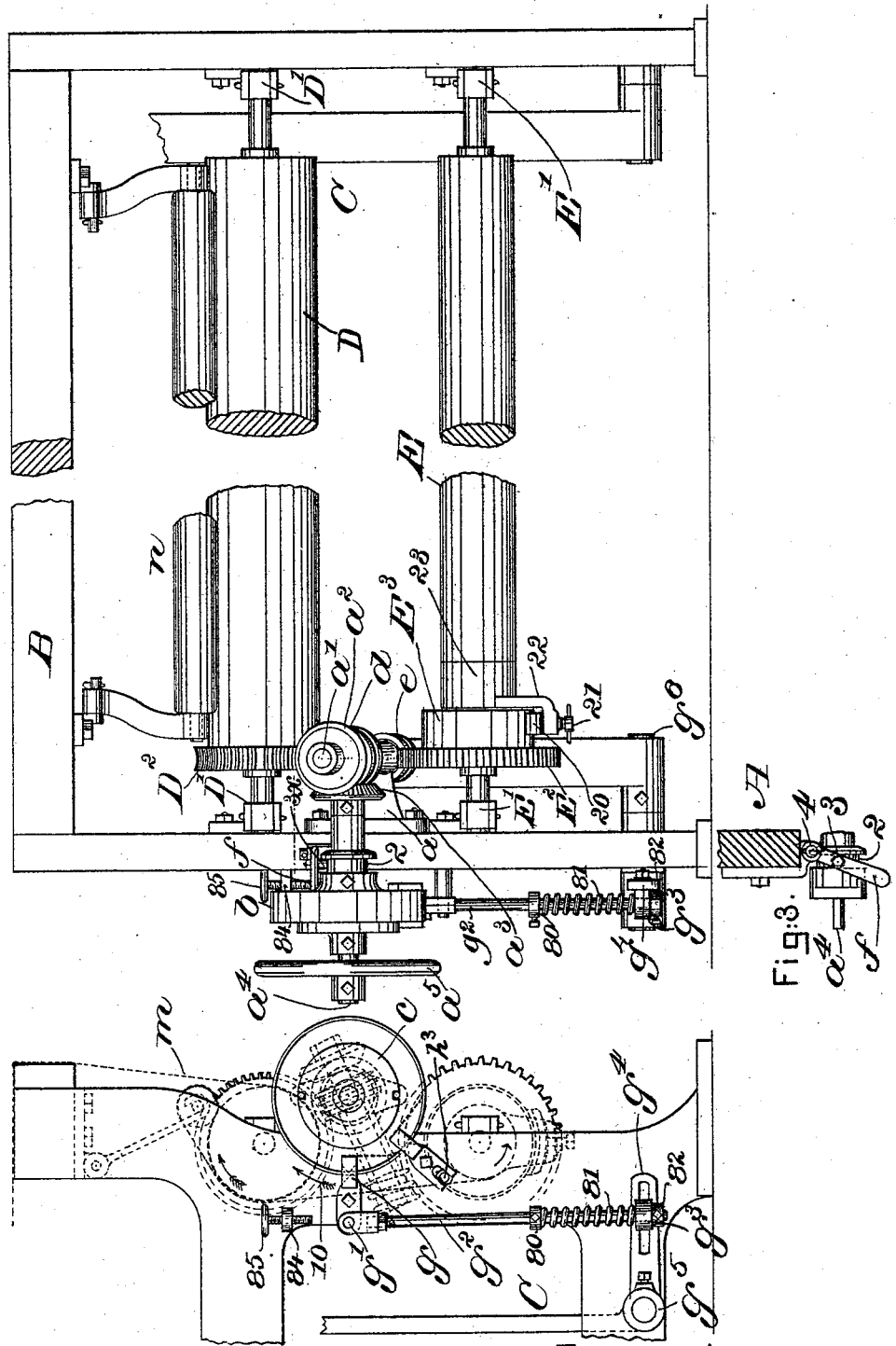

UNITED STATES PATENT OFFICE.

HORACE WYMAN, OF WORCESTER, MASSACHUSETTS, ASSIGNOR TO THE CROMPTON LOOM WORKS, OF SAME PLACE.

TAKE-UP MECHANISM FOR LOOMS.

SPECIFICATION forming part of Letters Patent No. 498,418, dated May 30, 1893.

Application filed February 10, 1892. Serial No. 421,042. (No model.)

*To all whom it may concern:*

Be it known that I, HORACE WYMAN, of Worcester, county of Worcester, State of Massachusetts, have invented an Improvement in Take-Up Mechanism for Looms, of which the following description, in connection with the accompanying drawings, is a specification, like letters and numerals on the drawings representing like parts.

This invention has for its object the production of an improved take-up mechanism wherein the step-by-step movement of the winding roll is effected through a friction device consisting of a pulley or wheel, and a dog or clutch. The pulley and dog or clutch are of peculiar construction, the dog or clutch embracing the entire periphery or flange of the pulley or wheel.

In my improved take-up I have shown two rolls, one a feeding or driving roll to feed or draw the cloth or material over the breast-beam, and the other a winding or receiving roll; and these two rolls are arranged to be rotated by worms on one and the same shaft engaging worm-toothed pinions on the rolls, as will be described, the said shaft deriving its motion from a friction feed device.

The particular feature in which my invention consists will be hereinafter described in the specification and pointed out in the claims at the end thereof.

Figure 1 is a partial front elevation, broken out centrally, of a sufficient portion of a loom with my improvements herein to be claimed added to enable my invention to be understood. Fig. 2 is a left-hand elevation of the parts shown in Fig. 1; Fig. 3, a sectional detail below the line $x$, Fig. 1. Fig. 4 is a section of the friction or clutch pulley in the line $x'$, Fig. 5. Fig. 5 is a section of the friction or clutch pulley in the line $x^2$, Fig. 4; Fig. 6, a like section in the line $x^3$, Fig. 4. Figs. 7 and 8 are sectional details of a friction check applied to one of the gears of one of the take-up rolls or beams.

The loom frame A; breast-beam B; and lay C, partially shown, are and may be of any usual shape, the frame having suitable bearings to sustain the working parts to be described. The roll D, mounted in bearings D', has fast on it a worm-toothed pinion $D^2$. The roll E, having bearings E', has loosely mounted on its shaft at one end a worm-toothed pinion $E^2$, provided at one side with a flange $E^3$, which is acted upon by a drag or friction block 20, having co-operating with it an adjusting screw 21, carried by an arm 22 of a hub 23, fast on the roll E. This friction block serves to connect the roll E and pinion $E^2$ frictionally so that the pinion can slip on the roll, as is necessary as the diameter of the mass of cloth wound upon the roll E increases.

The stand $a$ has a suitable bearing for a worm shaft $a'$, having near its opposite ends respectively worms $d$ and $e$, which engage respectively the pinions $D^2$, $E^2$, and rotate the beams D and E. The roll E is of smaller diameter than the roll D, but this, although preferable, is not essential.

The worm shaft $a'$ occupies an inclined position, as shown, or is so placed as to engage the worm-toothed pinions, one on its under and the other on its upper side; and to enable both beams to be rotated in opposite directions I have inclined the teeth of the worm-toothed pinions respectively in the same direction.

The shaft $a'$ has a bevel gear $a^2$, which is engaged by a bevel gear $a^3$, fast on shaft $a^4$, adapted, as shown, to be rotated by hand through a hand-wheel $a^5$ fast thereon, or through a friction or clutch pulley $b$ normally loose on the said shaft. The shaft $a^4$ has fast on it, at one side the friction pulley, a locking plate $c$ having one or more notches or projections, and loose on the said shaft at the other side of the said friction pulley is a hub $c'$, having an annular groove 2, and provided with one or more locking pins $c^2$, which are guided in and by the webs or spokes of the friction pulley, the pins being adapted to be projected through the said pulley and to engage the locking plate $c$ when the take-up is to be operated automatically, the said locking pins being withdrawn from engagement with the locking plate when for any reason the take-up is to be operated by hand. The annular groove 2 receives in it a roller or other stud 3 of a suitable lever $f$, mounted on a stud 4, the said lever being under the control of the operator.

The friction pulley $b$ has a T-shaped rim or periphery, see Figs. 5 and 6, which is embraced and gripped by a friction dog or clutch $g$, the shape of which is best shown in the sectional views Figs. 4 and 5. The inner end of the dog embraces the periphery of the pulley from side to side and engages both the outer and inner surfaces of the T-shaped periphery and hangs thereon. The outer end of the dog $g$ is jointed at $g'$ to an actuating device, shown as a link $g^2$, shown as extended loosely through a hole in a stud $g^3$, made adjustable preferably in a slot of an arm $g^4$, moving in unison with the lay, the extent of movement of the pulley $b$ by the dog, being controlled by adjusting the said stud in the said slot. The rod $g^2$ has a collar 80, below which is a spiral spring 81 which rests on the stud $g^3$, the lower end of the rod below the stud having a collar 82. By the introduction of the spring in the manner shown, the arm $g^4$ may be moved or rocked upwardly and compress the spring somewhat without at the same instant and to the same extent moving the cam $g$.

Above the upper end of the link and dog $g$ is placed a stud 84 containing a regulating screw 85 which, at the backward movement of the lay or upward movement of the arm $g^4$, carries through the spring the link until it comes in contact with the regulating screw and arrests the upward motion and prevents further movement of the dog $g$.

A detent $h$, made like the dog $g$, embraces the flanged periphery of the pulley $b$ and prevents retrograde motion thereof.

The dog $g$, as shown, has a friction spring $g^8$, and the detent $h$ a friction spring $h'$. As the lay is moved forward or toward the breast-beam, the dog $g$ is moved downward in the direction of the arrow, Fig. 4, and at such times bites and moves the friction pulley $b$, but when the lay is being moved from the breast-beam, the dog slips over and does not rotate the pulley $b$, and during this latter movement the detent $h$ prevents any rotation of the pulley $b$ in a backward direction. The detent is mounted loosely on a stud $h^3$, and is free to tip thereon to a limited extent.

The detent is so constructed and applied to the pulley as to bite the flange in the same manner as the dog $g$, which permits the pulley to move in a forward direction but prevents it from moving in a reverse direction.

The dog $g$ is of peculiar construction, i. e., it is composed of two arms 7, 8, shown best in Figs. 6 and 7, said arms being rigidly connected together by a bolt 6. Each arm is cut away at its inner face, as best represented in Fig. 4, to leave a space to embrace the projecting flange of the pulley and also present two V-shaped edges, one a little out of line with the other so as to contact with the opposite sides of the flange of the pulley, said edges moving in unison and when the dog is turned, as will be described, firmly biting the flange.

The cloth is supposed to take the following course from the breast-beam, see Fig. 2,— viz:—It descends as shown by dotted lines $m$, passes under the roll D from the right up about the rear side of said roll, between it and the guide roll $n$, over said guide roll to the left and down to the roll E, on which it is wound.

Having described my invention, what I claim, and desire to secure by Letters Patent, is—

1. The combination with the rolls D and E both located at the cloth-making end of the loom, and a worm-wheel on each roll, of a worm shaft located between the said worm-wheels and engaging the under side of one worm-wheel and the upper side of the other worm-wheel, a friction clutch mechanism including a pulley having a T-shaped flange, an actuating dog composed of two arms rigidly bolted together and having V-shaped edges located out of line, said edges engaging the inner and outer edges of the flange of the pulley, the arm $g^4$, and the rod $g^2$ having a spring interposed between a fixture on itself and a fixed portion of the said arm, and connections between the clutch mechanism and the worm shaft, substantially as described.

2. A take-up roll provided with worm toothed pinions; a shaft provided with a worm to engage said pinions, and a bevel gear; a shaft as $a^4$ provided with a bevel gear, a locking plate, and a hand wheel fast on said shaft $a^4$, combined with a hub loose on the said shaft and having a locking pin; and a pulley or wheel $b$ normally loose on said shaft $a^4$ intermediate the said hub and locking plate, to operate, substantially as described.

3. In a take-up mechanism, a friction pulley having a T-shaped flange; a rigid actuating dog embracing the T-shaped flange of the pulley from edge to edge and contacting with said flange by a tooth both within and without, and hanging at one end on said flange; and a friction spring co-operating with said dog and bearing upon the interior of said flange; combined with a link to which the other end of said dog is joined to move the arm $g^4$ to which said link is connected, and an adjustable stop to control the upward movement of the arm $g^4$, to operate, substantially as described.

4. The combination with the rolls D and E, and worm-toothed pinions, one for each roll, of a shaft located between the said toothed pinions and provided with two worms, one worm engaging the under side of one of the said pinions and the other worm the upper side of the other pinion, actuating devices for said worm shaft, and a friction device to connect the pinion of the roll E to it, substantially as described.

5. The combination in a loom of the following instrumentalities, viz:—the rolls D and E, having worm toothed pinions, one for each roll, a shaft located between said pinions and provided with two worms, one worm engaging the under side of one of the said pinions, and the other worm the upper side of the other of said pinions; a friction clutch device, and an intermediate gear to rotate the said worm shaft; and a friction device connecting the roll E and its pinion, to operate, substantially as described.

6. The combination with the rolls D and E, and worm toothed pinions, one for each roll, of a shaft located between the said toothed pinions and provided with two worms, one worm engaging the under side of one of the said pinions, a friction clutch device, and intermediate gearing to rotate the said worm shaft, and a friction device to connect the pinion of the roll E to it, substantially as described.

In testimony whereof I have signed my name to this specification in the presence of two subscribing witnesses.

HORACE WYMAN.

Witnesses:
JUSTIN A. WARE,
SAMUEL B. SCHOFIELD.